United States Patent [19]

Zimmerman

[11] Patent Number: 5,850,177
[45] Date of Patent: Dec. 15, 1998

[54] ANTI-LOCK BRAKING SYSTEM INDICATOR

[76] Inventor: Michael D. Zimmerman, 40 Seascape, Laguna Niguel, Calif. 92677

[21] Appl. No.: 915,745

[22] Filed: Aug. 21, 1997

[51] Int. Cl.$^6$ .................................................. G60Q 1/44
[52] U.S. Cl. ..................... 340/479; 340/467; 340/453; 340/458
[58] Field of Search ................... 340/479, 467, 340/453, 458, 464, 469, 471, 472; 303/122.05, 113.1, 118.1, 113.5

[56] References Cited

U.S. PATENT DOCUMENTS

| | | | |
|---|---|---|---|
| 4,127,844 | 11/1978 | Purdy | 340/71 |
| 4,827,245 | 5/1989 | Lipman | 340/321 |
| 4,843,368 | 6/1989 | Poulos | 340/464 |
| 4,876,525 | 10/1989 | Gross | 340/436 |
| 4,983,952 | 1/1991 | Athalye | 340/467 |
| 5,139,115 | 8/1992 | Browne et al. | 188/1.11 |
| 5,172,095 | 12/1992 | Scott | 340/479 |
| 5,231,373 | 7/1993 | Freeman et al. | 340/469 |
| 5,499,009 | 3/1996 | Davis | 340/468 |
| 5,677,670 | 10/1997 | Gangloff | 340/479 |
| 5,692,827 | 12/1997 | Chinniah et al. | 362/336 |

*Primary Examiner*—Jeffery A. Hofsass
*Assistant Examiner*—Toan N. Pham

[57] ABSTRACT

An anti-lock braking system indicator is provided including a brake switch relay for transmitting power upon the depression of a brake pedal of the vehicle. Associated therewith is an anti-lock braking system relay for transmitting power only upon both the prevention of wheels of the vehicle from locking during braking and the transmission of power by the brake switch. At least one lamp is mounted on the vehicle. Finally, a strobe mechanism is connected between the relay and each of the lamps. The strobe mechanism is adapted to intermittently transmit power to each lamp upon the receipt thereof.

5 Claims, 2 Drawing Sheets

ANTI-LOCK BRAKING SYSTEM INDICATOR

BACKGROUND OF THE INVENTION

1. Field of the Invention

The present invention relates to anti-lock braking systems and more particularly pertains to a new anti-lock braking system indicator for providing an indication of the braking of a vehicle wherein the anti-lock braking system is employed.

2. Description of the Prior Art

The use of anti-lock braking systems is known in the prior art. More specifically, anti-lock braking systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art anti-lock braking systems include U.S. Pat. No. 4,663,609; U.S. Pat. No. 5,139,115; U.S. Pat. No. 5,404,130; U.S. Pat. No. 5,434,554; U.S. Pat. No. 4,876,525; and U.S. Pat. No. Des. 316,230.

In these respects, the anti-lock braking system indicator according to the present invention substantially departs from the conventional concepts and designs of the prior art, and in so doing provides an apparatus primarily developed for the purpose of providing an indication of the braking of a vehicle wherein the anti-lock braking system is employed.

SUMMARY OF THE INVENTION

In view of the foregoing disadvantages inherent in the known types of anti-lock braking systems now present in the prior art, the present invention provides a new anti-lock braking system indicator construction wherein the same can be utilized for providing an indication of the braking of a vehicle wherein the anti-lock braking system is employed.

The general purpose of the present invention, which will be described subsequently in greater detail, is to provide a new anti-lock braking system indicator apparatus and method which has many of the advantages of the anti-lock braking systems mentioned heretofore and many novel features that result in a new anti-lock braking system indicator which is not anticipated, rendered obvious, suggested, or even implied by any of the prior art anti-lock braking systems, either alone or in any combination thereof.

To attain this, the present invention generally comprises a brake switch relay with a coil connected to a braking system of a vehicle. During operation, the coil actuates upon the depression of a brake pedal of the vehicle. The brake switch relay further includes a normally open contact which closes only upon the actuation of the brake switch relay coil. As shown in FIG. 1, the normally open contact of the brake switch relay has a first terminal connected to a constant voltage source. Next provided is an anti-lock braking system relay having a coil connected to an anti-lock braking system of the vehicle. The coil of the anti-lock braking relay is adapted to actuate upon the prevention of wheels of the vehicle from locking during braking. Associated therewith is a normally open contact. Upon the actuation of the anti-lock braking system relay coil, the anti-lock braking system relay the normally open contact closes. The normally open contact of the anti-lock braking system relay has a first terminal connected to a second terminal of the normally open contact of the brake switch. With reference still to FIG. 1, it is shown that a plurality of lamps are included. Each of such lamps are situated within each of the lamp compartments of the vehicle. Each lamp has xenon gas located therein for illuminating a high intensity light upon the receipt of power. As shown in FIG. 1, a strobe means is connected between a second terminal of the normally open contact of the anti-braking system relay and each of the lamps. In use, the strobe means is adapted intermittently transmit power to the lamps upon the receipt thereof. As such, the strobe means functions similar to an astable multivibrator. It should be noted that the strobe means functions further to step up the voltage received from the power source. As such, the voltage associated with the power delivered is of a sufficient magnitude which is capable of the xenon gas of the lamps.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new anti-lock braking system indicator apparatus and method which has many of the advantages of the anti-lock braking systems mentioned heretofore and many novel features that result in a new anti-lock braking system indicator which is not anticipated, rendered obvious, suggested, or even implied by any of the prior art anti-lock braking systems, either alone or in any combination thereof.

It is another object of the present invention to provide a new anti-lock braking system indicator which may be easily and efficiently manufactured and marketed.

It is a further object of the present invention to provide a new anti-lock braking system indicator which is of a durable and reliable construction.

An even further object of the present invention is to provide a new anti-lock braking system indicator which is susceptible of a low cost of manufacture with regard to both materials and labor, and which accordingly is then susceptible of low prices of sale to the consuming public, thereby making such anti-lock braking system indicator economically available to the buying public.

Still yet another object of the present invention is to provide a new anti-lock braking system indicator which provides in the apparatuses and methods of the prior art some of the advantages thereof, while simultaneously overcoming some of the disadvantages normally associated therewith.

Still another object of the present invention is to provide a new anti-lock braking system indicator for providing an indication of the braking of a vehicle wherein the anti-lock braking system is employed.

Even still another object of the present invention is to provide a new anti-lock braking system indicator that includes a brake switch relay for transmitting power upon the depression of a brake pedal of the vehicle. Associated therewith is an anti-lock braking system relay for transmitting power only upon both the prevention of wheels of the vehicle from locking during braking and the transmission of power by the brake switch. At least one lamp is mounted on the vehicle. Finally, a strobe mechanism is connected between the relay and each of the lamps. The strobe mechanism is adapted to intermittently transmit power to each lamp upon the receipt thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
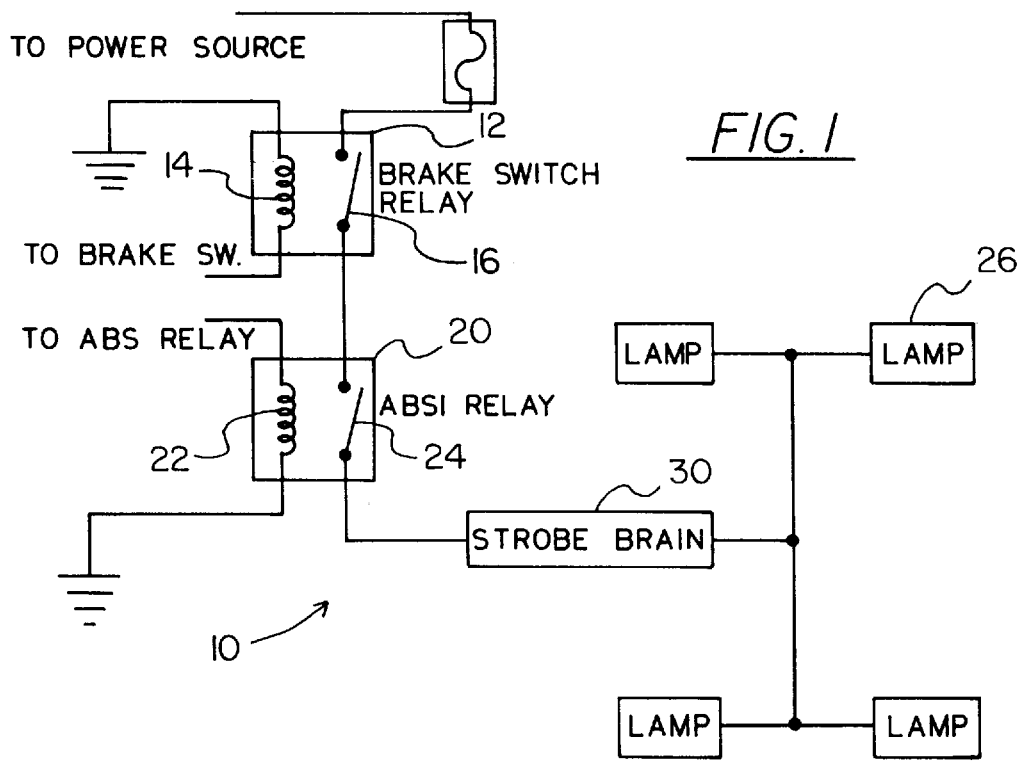
FIG. 1 is a schematic diagram of a new anti-lock braking system indicator according to the present invention.

With reference now to the drawings, and in particular to FIGS. 1 through 4 thereof, a new anti-lock braking system indicator embodying the principles and concepts of the present invention and generally designated by the reference numeral 10 will be described.

The system as designated as numeral 10 first includes a brake switch relay 12 with a coil 14 connected to a braking system of a vehicle. During operation, the coil actuates upon the depression of a brake pedal of the vehicle. It should be understood that the actuation of the coil constitutes a current being drawn by the coil thereby effecting an electromagnetic field. The brake switch relay further includes a normally open contact 16 which closes only upon the actuation of the brake switch relay coil. As shown in FIG. 1, the normally open contact of the brake switch relay has a first terminal connected to a constant voltage source.

Next provided is an anti-lock braking system relay 20 having a coil 22 connected to an anti-lock braking system of the vehicle. The coil of the anti-lock braking system relay is adapted to actuate upon the activation of the anti-lock braking system. Such activation may be defined as the prevention of wheels of the vehicle from locking during braking. Associated therewith is a normally open contact 24. Upon the actuation of the anti-lock braking system relay coil, the normally open contact of the anti-lock braking system relay closes. The normally open contact of the anti-lock braking system relay has a first terminal connected to a second terminal of the normally open contact of the brake switch.

With reference still to FIG. 1, it is shown that a plurality of lamps 26 are included. Each of such lamps are situated within each of the lamp compartments of the vehicle. Each lamp has xenon gas situated therein for illuminating a high intensity light upon the receipt of power. While various other types of bulbs may be utilized with the present invention, it preferred that xenon lamps be employed for cost effectiveness and intensity of illumination.

As shown in FIG. 1, a strobe means 30 is connected between a second terminal of the normally open contact of the anti-lock braking system relay and each of the lamps. In use, the strobe means is adapted to intermittently transmit power to the lamps upon the receipt thereof. As such, the strobe means functions similar to an astable multivibrator. It should be noted that the strobe means functions further to step up the voltage received from the power source. As such, the voltage associated with the power delivered is of a sufficient magnitude which is capable illuminating the xenon gas of the lamps.

While splicing may be employed to interconnect the foregoing components with those which are already existent in the vehicle, it should be noted the an adapter 31 may readily be used which may be conveniently connected between the existing circuits of the vehicle and lamps. Note FIG. 3. If the present invention is being installed during manufacture of the vehicle, the components of the present invention may be incorporated directly within the existing circuitry of the vehicle.

Figure 2:
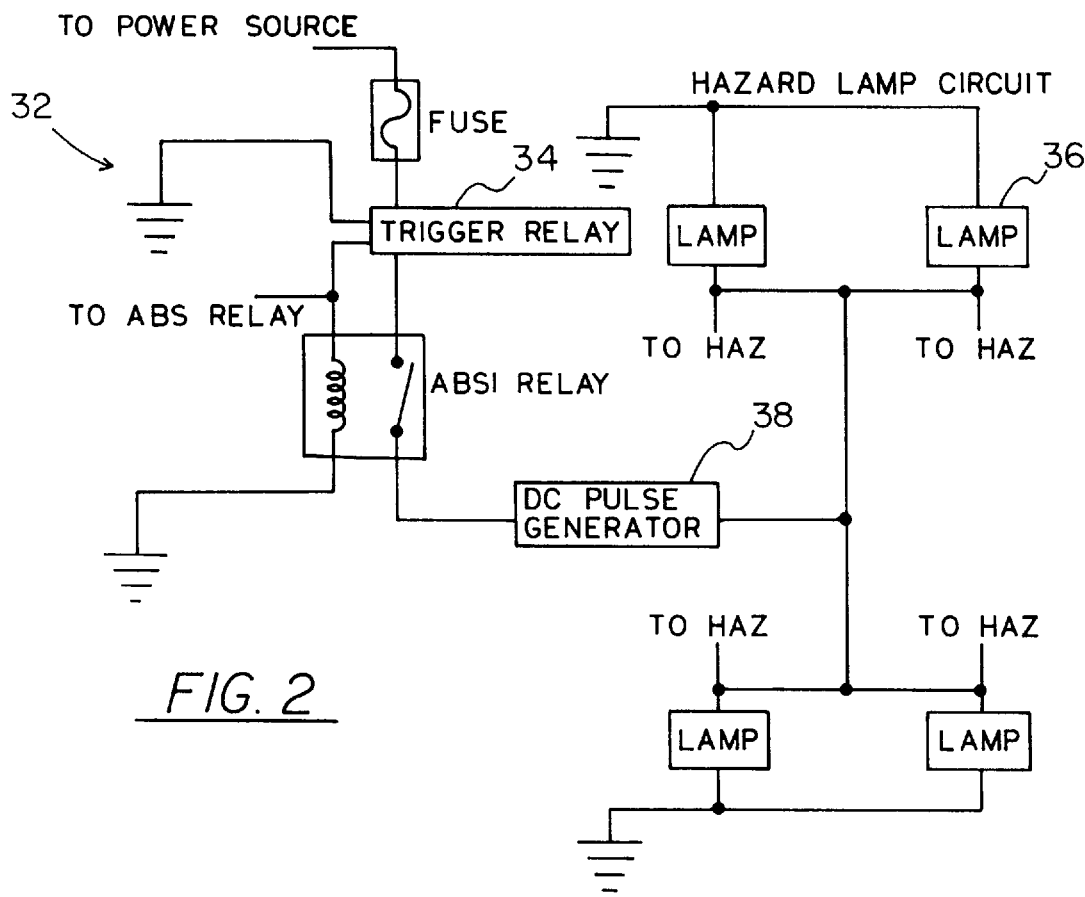
FIG. 2 is a schematic diagram of an alternate embodiment of the present invention.
Figure 3:
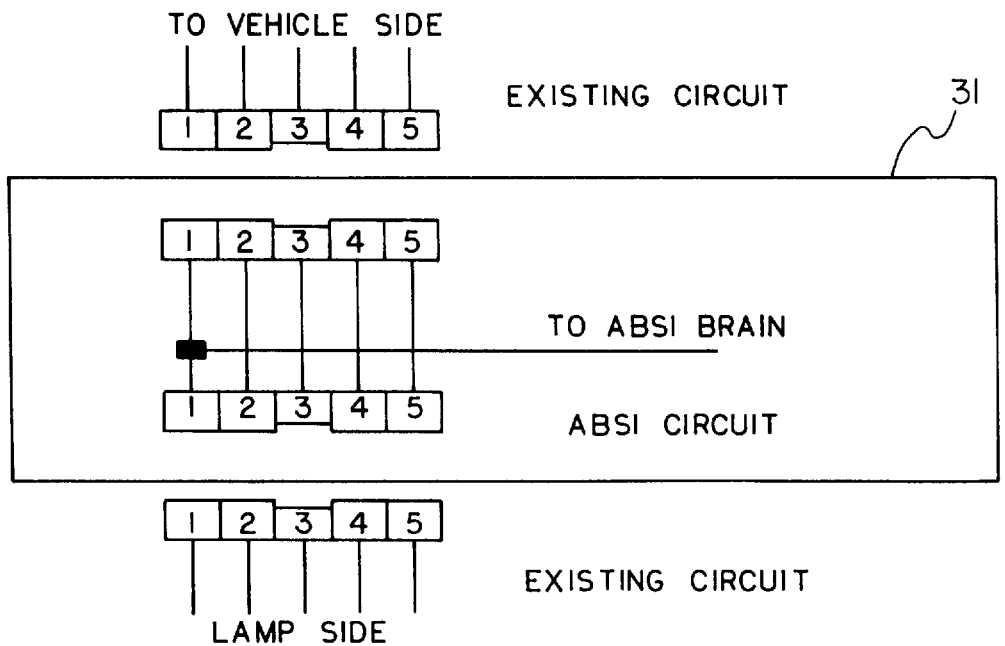
FIG. 3 is an illustration of an adapter that is preferably included with the present invention.

A first alternate embodiment 32, as shown in FIG. 2, will now be described. In describing such embodiment, it is important to note that the power source only delivers power upon the actuation of the vehicle. In other words, such power source is connected to the ignition of the vehicle. In place of the foregoing brake switch relay, the system of the present embodiment further includes a trigger relay 34 connected to an anti-lock braking system, the power source, and the anti-lock braking system relay. The trigger relay is basically a switching circuit which remains open upon the receipt of power from the power source and further closes upon the cessation of the receipt of a first power signal from the anti-lock braking system. After such initial closure, the trigger relay remains closed until the vehicle is deactuated thereby allowing the transfer of power by the anti-lock brake relay to the strobe during use. It is important to understand that the inclusion of the trigger relay is specifically tailored to prevent the actuation of the lamps upon the receipt of the initial voltage signal which is conventionally received from the anti-lock braking system upon the start-up of the vehicle. As shown in FIG. 2, the present embodiment serves to illuminate a set of hazard lights 36 of the vehicle in lieu of the xenon lamps. As such, a simple DC pulse generator 38 is required instead of the aforementioned strobe means.

Figure 4:
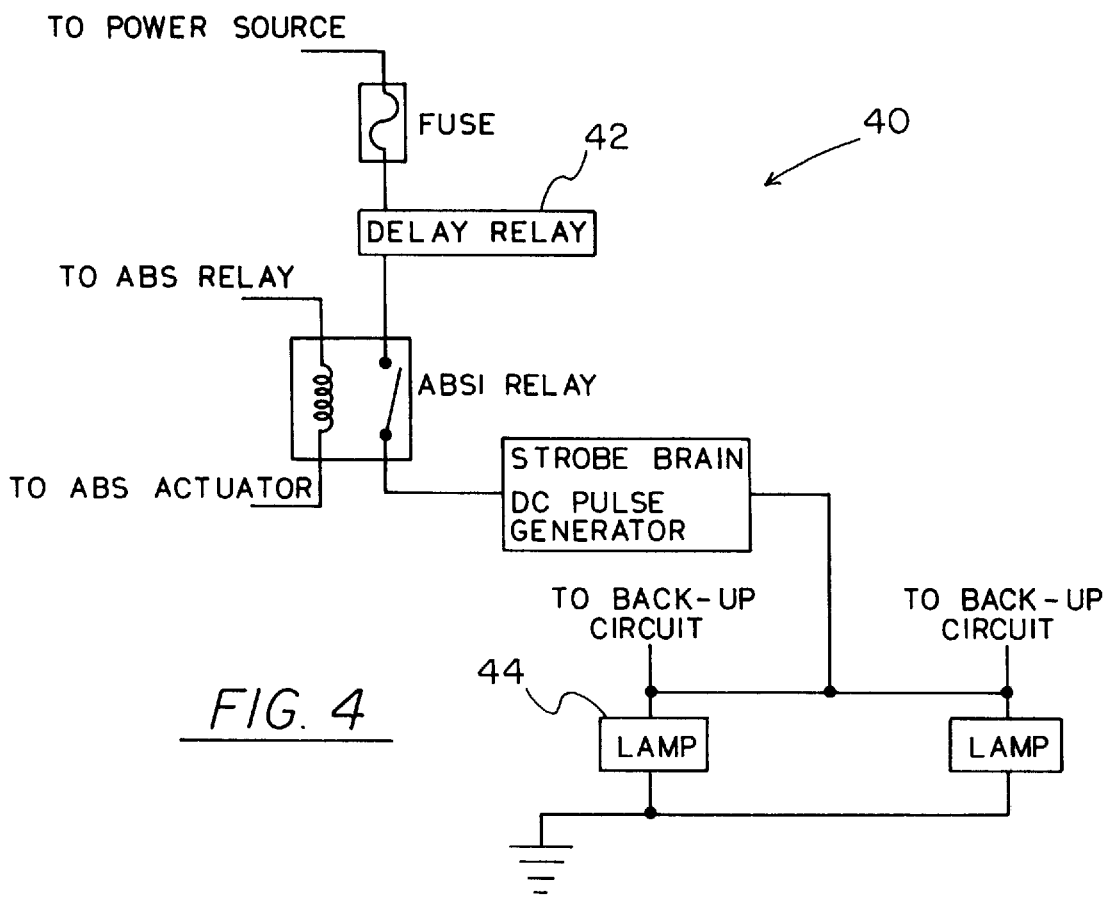
FIG. 4 is a schematic diagram of an alternate form of the alternate embodiment shown in FIG. 2.

Yet another alternate embodiment 40 will now be set forth. Such alternate embodiment may be seen in FIG. 4. In the present embodiment, the system includes a delay relay 42 connected to the power source and the anti-lock braking system relay. The delay relay functions to remain open for only a predetermined amount of time upon the receipt of power from the power source and further close upon the cessation of the predetermined amount of time, thereby allowing the transfer of power by the anti-lock brake relay to the strobe means. As such, power is precluded from being supplied to the lamps during the time period during which the initial voltage signal is received from the anti-lock braking system. As shown in FIG. 4, the lamps in the present embodiment consist of a set of reverse lights 44 of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An anti-lock braking system indicator comprising, in combination:
   a brake switch relay having a coil connected to a braking system of a vehicle and adapted to actuate upon the depression of a brake pedal of the vehicle, the brake switch relay further including a normally open contact adapted to close only upon the actuation of the brake switch relay coil, the normally open contact of the brake switch relay having a first terminal connected to a constant voltage source;
   an anti-lock braking system relay having a coil connected to an anti-lock braking system of the vehicle and adapted to actuate upon the prevention of wheels of the vehicle from locking during braking, the anti-lock braking system relay further including a normally open contact adapted to close only upon the actuation of the anti-lock braking system relay coil, the normally open contact of the anti-lock braking system relay having a first terminal connected to a second terminal of the normally open contact of the brake switch;
   a plurality of lamps each situated within each of the lamp compartments of the vehicle, each lamp having xenon gas located therein for illuminating a high intensity light upon the receipt of power; and
   strobe means connected between a second terminal of the normally open contact of the ant-braking system relay and each of the lamps, the strobe means adapted intermittently transmit power to the lamps upon the receipt thereof, wherein a voltage associated with the power is stepped up.

2. An anti-lock braking system indicator comprising:
   an anti-lock braking system relay for transmitting power from a power source only upon the prevention of wheels of the vehicle from locking during braking;
   at least one lamp mounted on the vehicle; and
   strobe connected between the relay and each of the lamps, the strobe adapted to intermittently transmit power to the lamps upon the receipt thereof;
   wherein the power source only delivers power upon the actuation of the vehicle, the system further including a delay relay connected to the power source and the anti-lock braking system relay and adapted to remain open for only a predetermined amount of time upon the receipt of power from the power source and further close upon the cessation of the predetermined amount of time thereby precluding the transmission of power to the strobe until after the actuation of the vehicle.

3. An anti-lock braking system indicator as set forth in claim 2 wherein the lamp is one of a set of reverse lights of the vehicle.

4. An anti-lock braking system indicator comprising:
   an anti-lock braking system relay for transmitting power from a power source only upon the prevention of wheels of the vehicle from locking during braking;
   at least one lamp mounted on the vehicle; and
   strobe connected between the relay and each of the lamps, the strobe adapted to intermittently transmit power to the lamps upon the receipt thereof;
   wherein the power source only delivers power upon the actuation of the vehicle, the system further including a trigger relay connected to an anti-lock braking system, the power source, and the anti-lock braking system relay and adapted to remain open upon the receipt of power from the power source and further closes upon the cessation of the receipt of a first power signal from the anti-lock braking system thereby allowing the transfer of power by the anti-lock brake relay to the strobe, wherein the trigger relay thereafter remains closed until the vehicle is deactuated, thereby preventing the actuation of the lamp upon the receipt of an initial voltage signal which is received from the anti-lock braking system upon the actuation of the vehicle.

5. An anti-lock braking system indicator as set forth in claim 4 wherein the lamp is one of a set of hazard lights of the vehicle.

* * * * *